US012297991B1

(12) United States Patent
Yang

(10) Patent No.: US 12,297,991 B1
(45) Date of Patent: May 13, 2025

(54) LIGHT STRING STRUCTURE BASED ON GLASS LED BEADS

(71) Applicant: Lusha Yang, Taizhou (CN)

(72) Inventor: Lusha Yang, Taizhou (CN)

( * ) Notice: Subject to any disclaimer, the term of this patent is extended or adjusted under 35 U.S.C. 154(b) by 0 days.

(21) Appl. No.: 18/615,972

(22) Filed: Mar. 25, 2024

(30) Foreign Application Priority Data

Jan. 31, 2024 (CN) ......................... 202420245678.5

(51) Int. Cl.

| | |
|---|---|
| ***F21K 9/232*** | (2016.01) |
| ***F21S 4/10*** | (2016.01) |
| ***F21V 19/00*** | (2006.01) |
| ***F21V 29/85*** | (2015.01) |
| ***F21V 33/00*** | (2006.01) |
| *F21Y 103/10* | (2016.01) |
| *F21Y 115/10* | (2016.01) |

(52) U.S. Cl.
CPC .............. *F21V 29/85* (2015.01); *F21K 9/232* (2016.08); *F21V 19/0025* (2013.01); *F21Y 2103/10* (2016.08); *F21Y 2115/10* (2016.08)

(58) Field of Classification Search
CPC ....... F21V 29/85; F21V 19/0025; F21K 9/232
See application file for complete search history.

(56) References Cited

U.S. PATENT DOCUMENTS

| | | | | |
|---|---|---|---|---|
| 10,718,504 | B1 * | 7/2020 | Liang | H01R 33/09 |
| 12,044,365 | B1 * | 7/2024 | Zou | F21V 31/00 |

FOREIGN PATENT DOCUMENTS

| | | | | |
|---|---|---|---|---|
| CN | 203868790 U | * 10/2014 | | F21S 4/10 |
| CN | 214037894 U | 8/2021 | | |
| CN | 115460316 A | 12/2022 | | |
| CN | 219036348 U | 5/2023 | | |
| CN | 220287362 U | * 1/2024 | | |

OTHER PUBLICATIONS

Jin et al., CN 220287362 U, machine translation 2023 (Year: 2023).*
Han , CN-203868790-U, machine translation (Year: 2014).*

* cited by examiner

*Primary Examiner* — Tracie Y Green
(74) *Attorney, Agent, or Firm* — Nitin Kaushik

(57) ABSTRACT

The present disclosure discloses a lighting fixture, and aims to provide a light string structure based on glass LED beads. A key point of the technical solution of the present disclosure is that adding hot melt glue between filaments and at peripheral sides of chips effectively prevents relative movement of the filaments. Further, the hot melt glue is arranged at bottoms of the beads to prevent water vapor from entering the beads through joints between the beads and a conductive wire, which improves the waterproof performance, allows the product to be used outdoors for a long time, and enlarges the range of use of an LED lamp; meanwhile, the filaments inside the beads are welded to the conductive wire, so that the fixing effect is good; the displacement of the joints between the beads and the conductive wire is limited by thermal shrinkage films.

7 Claims, 3 Drawing Sheets

LIGHT STRING STRUCTURE BASED ON GLASS LED BEADS

TECHNICAL FIELD

The present disclosure relates to a lighting fixture, and more particular, to a light string structure based on glass light-emitting diode (LED) beads.

BACKGROUND

Since a manufacturing and packaging technology for a chip of an LED lamp is mature, the cost of an LED element is reduced. Thus, the LED lamp is widely used in lighting and decoration. Moreover, the LED lamp is good in energy conservation and long in service life, and has extremely high economic benefit.

At present, although the LED lamps on the market can achieve decoration and lighting, the sealing properties of most LED lamps are poor. When the LED lamp is used outdoors, a filament may be short-circuited by water ingress, which shortens the service life of the LED lamp and the safety of the LED lamp in the use process, thereby greatly reducing the scope of use of the LED lamp. Meanwhile, during the transportation of the LED lamp, beads are easily collided with each other and broken, so during the transportation, buffer pads need to be added between the beads, which increases the transportation cost and reduces the transportation efficiency.

SUMMARY

For the shortcomings in the prior art, the present disclosure aims to provide a light string structure based on glass LED beads, which has good sealing property and can protect the beads.

In order to achieve the above objective, the present disclosure provides the following technical solution: A light string structure based on glass LED beads, including a conductive wire and several glass LED beads electrically connected to the conductive wire, wherein each glass LED bead is internally provided with a filament, and an LED chip is arranged at a top end of the filament: the filaments are welded to the conductive wire; thermal shrinkage films are arranged at welding points between the glass LED beads and the conductive wire; and the thermal shrinkage films are further sleeved with rubber sleeves.

In a further setting of the present disclosure, a lighting chamber of each glass LED bead is a vacuum region: the filament of the LED bead and a shell of the LED bead are thermally molten and sealed through a glass package; and the LED bead and the glass package are both made of glass materials.

In a further setting of the present disclosure, each LED chip is coated with a resin layer: a shrinkage temperature of the thermal shrinkage film is less than a melting temperature of the resin layer; and an outer diameter for coating of the resin layer gradually decreases from a middle position of the LED chip to two ends.

In a further setting of the present disclosure, a ratio of a length of each thermal shrinkage film wrapped around the LED bead to a length of the thermal shrinkage film wrapped around the conductive wire is between 0.5 and 0.8.

In a further setting of the present disclosure, two cutting step surfaces are symmetrically arranged on each rubber sleeve, and a distance between the two cutting step surfaces is between 0.8 and 0.9 of the outer diameter of the rubber sleeve.

In a further setting of the present disclosure, an inner diameter of the rubber sleeve gradually decreases in a mounting direction of the rubber sleeve mounted on the glass LED bead, and a ratio of an inner diameter of one end of the rubber sleeve sleeving the glass LED bead to an inner diameter of one end of the rubber sleeve sleeving the conductive wire is between 0.6 and 0.8; and the rubber sleeve and the glass LED bead are in interference fit.

In a further setting of the present disclosure, the rubber sleeve is internally provided with a granular protrusion, and the granular protrusion is configured to increase friction between the rubber sleeve and the bead, as well as between the rubber sleeve and the conductive wire.

In a further setting of the present disclosure, a resin block configured to limit a distance between two filaments is further arranged between the two filaments.

By the adoption of the above technical solutions, in order to improve the connection strength of the glass LED beads, the filaments inside the glass LED beads are welded to the conductive wire, so that the fixing effect is good. The displacement of the joints between the glass LED beads and the conductive wire is limited by the thermal shrinkage films, which ensures the connection strength at the welding points and prevents the glass LED beads from falling off. Furthermore, adding hot melt glue and the resin blocks between the filaments and at the peripheral sides of the chips effectively prevents the relative movement of the filaments. The lighting chambers of the glass LED beads are further set as the vacuum regions, and the filaments of the LED beads and the shells of the LED beads are thermally molten and sealed through the glass packages. The LED beads and the glass packages are both made of the glass materials to prevent water vapor from entering the glass LED beads through the joints between the glass LED beads and the conductive wire, improves the waterproof performance, and allows the product to be used outdoors for a long time. In addition, the filaments inside the glass LED beads and the conductive wire are welded, so that the fixing effect is good.

Further, the sealing performance of the glass LED beads is improved by thermally shrinking and molding the thermal shrinkage films outside the glass LED beads and the conductive wire. Meanwhile, the hot melt glue arranged at bottoms of the glass LED beads further prevents the water vapor from entering the glass LED beads, which improves the waterproof performance of the joints between the LED filaments and the conductive wire, so that the LED lamp can be used outdoors, and the application range of the LED lamp is enlarged. The filaments and the conductive wire are fixed by the hot melt glue, so that the connection strength is high, which prevents the beads from falling off during use. Furthermore, the production difficulty of the thermal shrinkage films is low, so that a plurality of beads can be simultaneously thermally shrunk, achieving high production efficiency and good economic benefits. Meanwhile, during the thermal shrinkage of the thermal shrinkage films, the shrinkage temperature of the thermal shrinkage films is less than the melting temperature of the hot melt glue, which prevents damage to the hot melt glue inside the beads during the thermal shrinkage.

Meanwhile, in order to facilitate the mounting of the rubber sleeves, the ratio of the length of the thermal shrinkage film wrapped around the LED bead to the length of the thermal shrinkage film wrapped around the conductive wire is set between 0.5 and 0.8, and the two cutting step surfaces are symmetrically arranged on the rubber sleeve: the distance between the two cutting step surfaces is between 0.8 and 0.9 of the outer diameter of the rubber sleeve: the inner diameter of the rubber sleeve gradually decreases in the mounting direction of the rubber sleeve mounted on the glass LED bead, and the ratio of the inner diameter of one end of the rubber sleeve sleeving the glass LED bead to the inner diameter of one end of the rubber sleeve sleeving the conductive wire is between 0.6 and 0.8, so that the mounting difficulty of the rubber sleeve is low, and the connection stability after the mounting is completed is good.

Furthermore, the rubber sleeve is in interference fit with the thermally shrunk bead and the conductive wire, and the rubber sleeve is internally provided with the granular protrusion, which improves the connection strength of the rubber sleeve outside the bead. During the transportation of the light string, the rubber sleeve can be effectively prevented from falling off. In addition, a gap between the rubber sleeve and the thermal shrinkage film is small. When the light string is used outdoors, the water vapor can be effectively prevented from entering the thermal shrinkage films, which further improves the waterproof effect of the light string. The granular protrusion arranged on the inner wall of the rubber sleeve can further increase the friction between the rubber sleeve and the bead, as well as between the rubber sleeve and the conductive wire, which ensures that the rubber sleeve may not fall off.

The light string structure based on the glass LED beads of the present disclosure is manufactured by the following steps:

- S1: assembling of the beads: heating the glass beads to make the glass beads flexible, then inserting the beads into the filaments after opening the beads, and then vacuumizing the interiors of the beads before shrinkage;
- S2: connection and fixation of the light string: welding the filaments to the conductive wire, and sleeving the welding points with the thermal shrinkage films after the welding is completed;
- S3: thermal shrinkage: putting the light string sleeved with the thermal shrinkage films into a machine for thermal shrinkage to improve the connection strength of the entire light string; and
- S4. sleeving of the rubber sleeves: sleeving outer sides of the thermal shrinkage films with the rubber sleeves to complete the processing.

Figure 1:
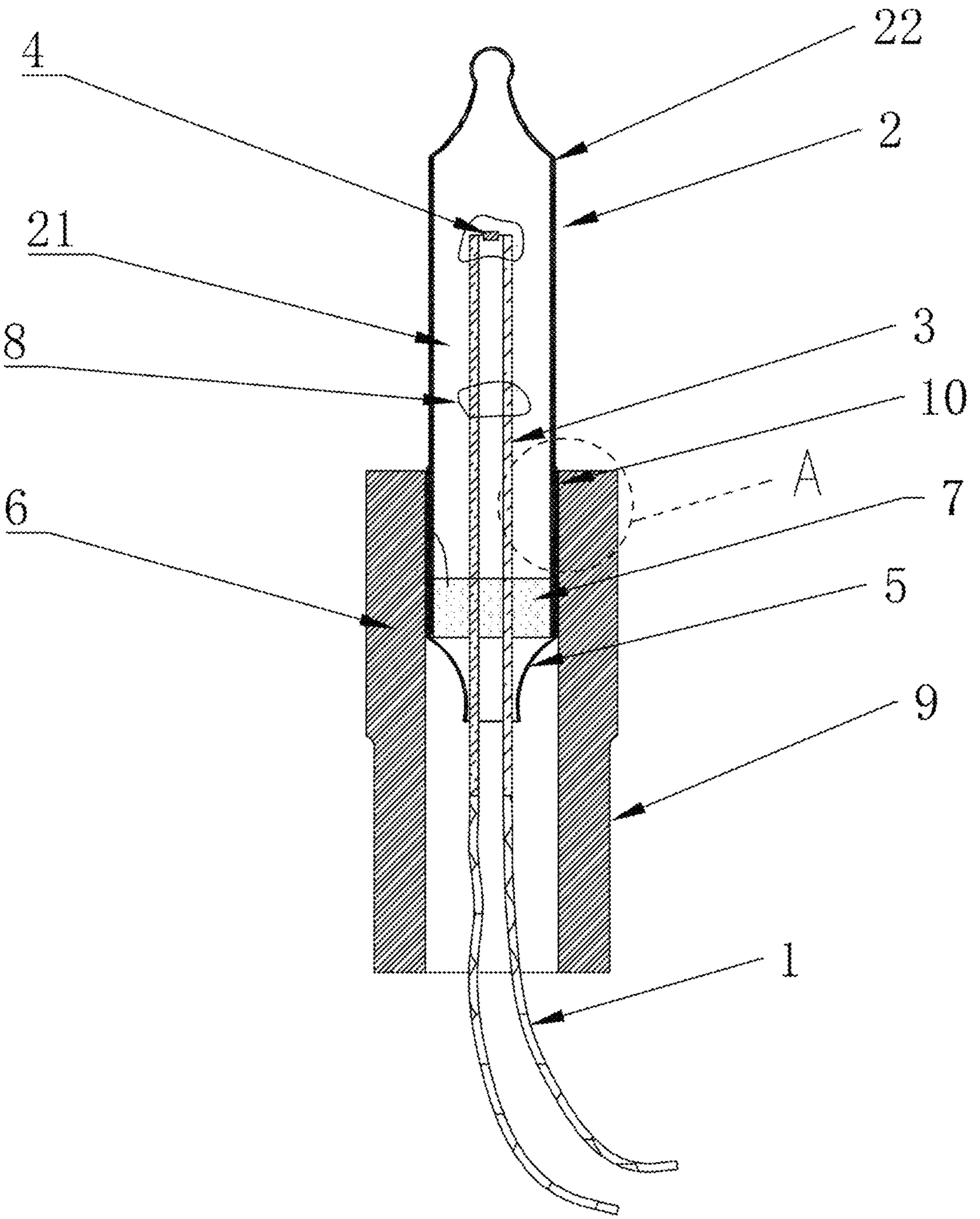
FIG. 1 is a sectional view of an embodiment of a light string structure based on glass LED beads according to the present disclosure.

Reference numerals in the drawings: 1: conductive wire; 2: glass LED beads; 21: lighting chamber: 22: shell: 3: filament: 4: LED chip; 5: thermal shrinkage film; 6: rubber sleeve; 7: hot melt glue: 8: resin: 9: step surface; and 10: granular protrusion.

DETAILED DESCRIPTION OF THE EMBODIMENTS

Figure 2:
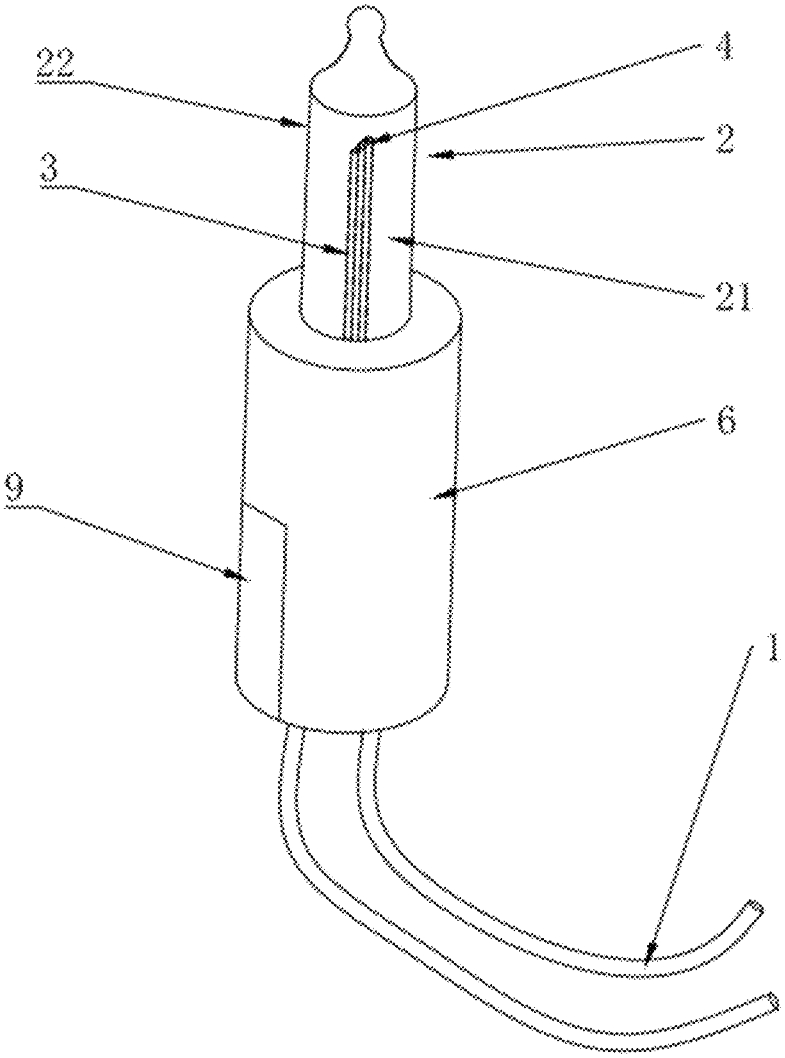
FIG. 2 is a specific schematic structural diagram of an embodiment of a light string structure based on glass LED beads according to the present disclosure.
Figure 3:
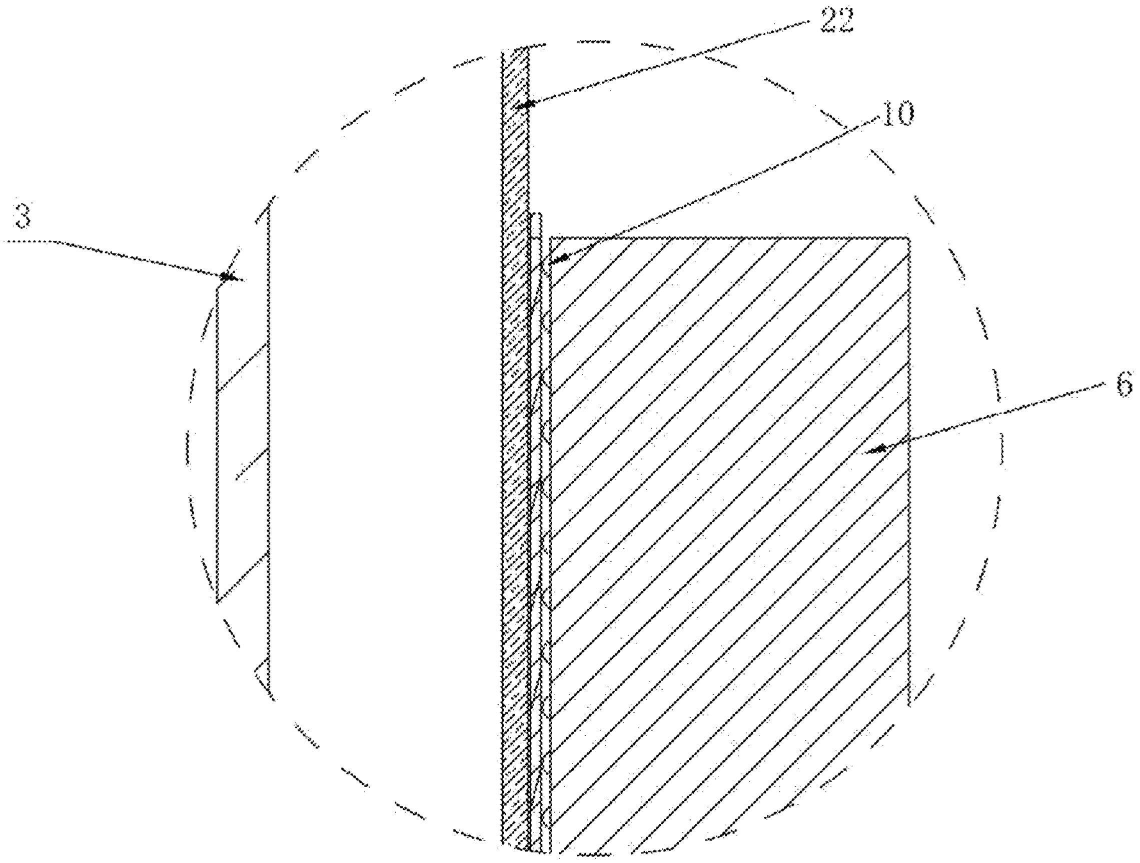
FIG. 3 is an enlarged partial view of the portion A shown in FIG. 1 according to the present disclosure.

Referring to FIG. 1 to FIG. 3, a further explanation is made to the embodiments of a light string structure based on glass LED beads according to the present disclosure.

For ease of explanation, spatial relative terms such as “up”, “down”, “left”, and “right” are used in the embodiments to illustrate a relationship between one element or feature shown in the figures and another element or feature. It should be understood that in addition to the orientations shown in the figures, the spatial terms are intended to include different orientations of a device during use or operation. For example, if the device in the figures is placed upside down, an element described as being located “below” another element or feature will be positioned as being “above” the another element or feature. Therefore, the exemplary term “down” can include both up and down orientations. The device can be positioned in other ways (rotated 90 degrees or in other orientations), and the spatial relative explanations used here can be explained correspondingly.

Moreover, relational terms such as “first” and “second” are only used to distinguish one component from another with the same name, without necessarily requiring or implying any actual relationship or order between these components.

A light string structure based on glass LED beads includes a conductive wire and several glass LED beads electrically connected to the conductive wire. Each glass LED bead is internally provided with a filament, and an LED chip is arranged at a top end of the filament: the filaments are welded to the conductive wire: thermal shrinkage films are arranged at welding points between the glass LED beads and the conductive wire; and the thermal shrinkage films are further sleeved with rubber sleeves. Meanwhile, hot melt glue is further arranged at bottoms of the glass LED beads, and the hot melt glue is configured to fix the filaments inside the glass LED beads. Meanwhile, hot melt glue for reinforcement is arranged at peripheral sides of the chips and between the filaments.

Further, a shrinkage temperature of the thermal shrinkage film is less than a melting temperature of the hot melt glue, and the thermal shrinkage film is thermally shrunk and formed outside the glass LED beads and the conductive wire. Meanwhile, an inner diameter of the rubber sleeve is matched with a size f the thermal shrinkage film after thermal shrinkage: a ratio of a length of the thermal shrinkage film wrapped around the LED bead to a length of the thermal shrinkage film wrapped around the conductive wire is set between 0.5 and 0.8, and two cutting step surfaces are symmetrically arranged on the rubber sleeve: a distance between the two cutting step surfaces is between 0.8 and 0.9 of an outer diameter of the rubber sleeve: the inner diameter of the rubber sleeve gradually decreases in a mounting direction of the rubber sleeve mounted on the glass LED bead: a ratio of an inner diameter of one end of the rubber sleeve sleeving the glass LED bead to an inner diameter of one end of the rubber sleeve sleeving the conductive wire is between 0.6 and 0.8; and the rubber sleeve and the glass LED bead are in interference fit.

In this embodiment, in order to improve the connection strength of the glass LED beads, the filaments inside the glass LED beads are welded to the conductive wire, so that the fixing effect is good. The displacement of joints between the glass LED beads and the conductive wire is limited by the thermal shrinkage films, which ensures the connection strength at welding points and prevents the glass LED beads from falling off. Furthermore, adding the hot melt glue and resin blocks between the filaments and at the peripheral sides of the chips effectively prevents the relative movement of the filaments. Further, the hot melt glue is arranged at the bottoms of the glass LED beads, which prevents water vapor from entering the glass LED beads through the joints between the glass LED beads and the conductive wire, improves the waterproof performance, and allows the product to be used outdoors for a long time. In addition, the filaments inside the glass LED beads and the conductive wire are welded, so that the fixing effect is good.

Further, the sealing performance of the glass LED beads is improved by thermally shrinking and molding the thermal shrinkage films outside the glass LED beads and the conductive wire. Meanwhile, the hot melt glue arranged at bottoms of the glass LED beads further prevents the water vapor from entering the glass LED beads, which improves the waterproof performance of the joints between the LED filaments and the conductive wire, so that the LED lamp can be used outdoors, and the application range of the LED lamp is enlarged. The filaments and the conductive wire are fixed by the hot melt glue, so that the connection strength is high, which prevents the beads from falling off during use. Furthermore, the production difficulty of the thermal shrinkage films is low; so that a plurality of beads can be simultaneously thermally shrunk, achieving high production efficiency and good economic benefits. Meanwhile, during the thermal shrinkage of the thermal shrinkage films, the shrinkage temperature of the thermal shrinkage films is less than the melting temperature of the hot melt glue, which prevents damage to the hot melt glue inside the beads during the thermal shrinkage.

After the welding of the LED lamp is completed, the glass LED beads sleeved with the thermal shrinkage films and the conductive wire need to be put into a machine for thermal shrinkage for reinforcement. The shrinkage temperature of the thermal shrinkage film is 120 to 180° C., and the melting temperature of the hot melt glue inside the glass LED beads is 160 to 180° C. A temperature inside the machine can be set to be 120 to 150° C., so that the quality of the product will not be affected because the hot melt glue inside the glass LED beads will not be affected when the thermal shrinkage films shrink for reinforcement.

In order to facilitate the mounting of the rubber sleeves, the ratio of the length of the thermal shrinkage film wrapped around the LED bead to the length of the thermal shrinkage film wrapped around the conductive wire is set between 0.5 and 0.8, and the two cutting step surfaces are symmetrically arranged on the rubber sleeve: the distance between the two cutting step surfaces is between 0.8 and 0.9 of the outer diameter of the rubber sleeve: the inner diameter of the rubber sleeve gradually decreases in the mounting direction of the rubber sleeve mounted on the glass LED bead; and the ratio of the inner diameter of one end of the rubber sleeve sleeving the glass LED bead to the inner diameter of one end of the rubber sleeve sleeving the conductive wire is between 0.6 and 0.8, so that the mounting difficulty of the rubber sleeve is low, and the connection stability after the mounting is completed is good.

Furthermore, the rubber sleeve is in interference fit with the thermally shrunk bead and the conductive wire, and the rubber sleeve is internally provided with the granular protrusion 10, which improves the connection strength of the rubber sleeve outside the bead. During the transportation of the light string, the rubber sleeve can be effectively prevented from falling off. In addition, a gap between the rubber sleeve and the thermal shrinkage film is small. When the light string is used outdoors, the water vapor can be effectively prevented from entering the thermal shrinkage films, which further improves the waterproof effect of the light string. The granular protrusion 10 arranged on the inner wall of the rubber sleeve can further increase the friction between the rubber sleeve and the bead, as well as between the rubber sleeve and the conductive wire, which ensures that the rubber sleeve may not fall off.

The light string structure based on the glass LED beads of the present disclosure is manufactured by the following steps:

- S1: assembling of the beads: heating the glass beads to make the glass beads flexible, then inserting the beads into the filaments after opening the beads, and then vacuumizing the interiors of the beads before shrinkage;
- S2: connection and fixation of the light string: welding the filaments to the conductive wire, and sleeving the welding points with the thermal shrinkage films after the welding is completed;
- S3: thermal shrinkage: putting the light string sleeved with the thermal shrinkage films into a machine for thermal shrinkage to improve the connection strength of the entire light string; and
- S4. sleeving of the rubber sleeves: sleeving outer sides of the thermal shrinkage films with the rubber sleeves to complete the processing.

The above-mentioned embodiments are only preferred embodiments of the present disclosure and are not intended to limit the present disclosure, and the usual changes and substitutions made by those skilled in the art within the scopes of the technical solutions of the present disclosure shall fall within the protection scope of the present disclosure.

What is claimed is:

1. A light string structure based on glass light-emitting diode (LED) beads, comprising a conductive wire and several glass LED beads electrically connected to the conductive wire, wherein each glass LED bead comprises a filament and an LED chip arranged on the filament: the filaments are welded to the conductive wire: thermal shrinkage films are arranged at welding points between the glass LED beads and the conductive wire: the thermal shrinkage films are configured to tightly abut against surfaces of the glass LED beads and a surface of the conductive wire under a high temperature; and the thermal shrinkage films are further sleeved with rubber sleeves:

a lighting chamber of each glass LED bead is a vacuum region; the filament of the glass LED bead and a shell of the glass LED bead are thermally molten and sealed through a glass package; and the glass LED bead and the glass package are both made of glass materials.

2. The light string structure based on the glass LED beads according to claim 1, wherein each LED chip is coated with a resin layer: a shrinkage temperature of the thermal shrinkage film is less than a melting temperature of the resin layer; and an outer diameter for coating of the resin layer gradually decreases from a middle position of the LED chip to two ends.

3. The light string structure based on the glass LED beads according to claim 1, wherein a ratio of a length of each thermal shrinkage film wrapped around the glass LED bead to a length of the thermal shrinkage film wrapped around the conductive wire is between 0.5 and 0.8.

4. The light string structure based on the glass LED beads according to claim 1, wherein two cutting step surfaces are symmetrically arranged on each rubber sleeve, and a distance between the two cutting step surfaces is between 0.8 and 0.9 of the outer diameter of the rubber sleeve.

5. The light string structure based on the glass LED beads according to claim 4, wherein an inner diameter of the rubber sleeve gradually decreases in a mounting direction of the rubber sleeve mounted on the glass LED bead, and a ratio of an inner diameter of one end of the rubber sleeve sleeving the glass LED bead to an inner diameter of one end of the rubber sleeve sleeving the conductive wire is between 0.6 and 0.8; and the rubber sleeve and the glass LED bead are in interference fit.

6. The light string structure based on the glass LED beads according to claim 5, wherein the rubber sleeve is internally provided with a granular protrusion, and the granular protrusion is configured to increase friction between the rubber sleeve and the bead, as well as between the rubber sleeve and the conductive wire.

7. The light string structure based on the glass LED beads according to claim 1, wherein a resin block configured to limit a distance between two filaments is further arranged between the two filaments.

* * * * *